(12) United States Patent
Dupont

(10) Patent No.: US 10,985,920 B2
(45) Date of Patent: Apr. 20, 2021

(54) ADAPTIVE DEVICE FOR BIOMETRIC AUTHENTICATION USING ULTRASOUND, INFRARED AND CONTRAST VISIBLE LIGHT PHOTOGRAPHS, WITHOUT DISCLOSURE, VIA A DECENTRALISED COMPUTER NETWORK

(71) Applicant: Sebastien Dupont, Rainneville (FR)

(72) Inventor: Sebastien Dupont, Rainneville (FR)

( * ) Notice: Subject to any disclaimer, the term of this patent is extended or adjusted under 35 U.S.C. 154(b) by 26 days.

(21) Appl. No.: 16/134,081

(22) Filed: Sep. 18, 2018

(65) Prior Publication Data

US 2019/0089539 A1 Mar. 21, 2019

Related U.S. Application Data

(63) Continuation of application No. PCT/FR2017/000055, filed on Mar. 21, 2017.

(30) Foreign Application Priority Data

Mar. 21, 2016 (FR) ...................................... 1600460

(51) Int. Cl.
*H04L 9/32* (2006.01)
*G06K 9/00* (2006.01)
(Continued)

(52) U.S. Cl.
CPC ............ *H04L 9/3231* (2013.01); *G06F 21/32* (2013.01); *G06K 9/0002* (2013.01);
(Continued)

(58) Field of Classification Search
CPC ....... H04L 9/3231; H04L 9/0866; H04L 9/14; H04L 9/3247; H04L 63/0428;
(Continued)

(56) References Cited

U.S. PATENT DOCUMENTS 5,111,817 A * 5/1992 Clark ................. A61B 5/02007
356/41
6,494,900 B1 * 12/2002 Salansky .............. A61N 5/0616
606/13

(Continued)

*Primary Examiner* — Shahriar Zarrineh
(74) *Attorney, Agent, or Firm* — Blueshift IP, LLC; Robert Plotkin

(57) ABSTRACT

The invention relates to a biometric authentication device, comprising:
 a positioning module with measurement zone;
 a cryptographic calculation module;
 ultrasound module;
 a module for measuring heart rate and blood pressure;
 a photographic module configured to create
  a photograph of the venous network of the finger;
  a photograph of the fingerprint of the finger;
  a contrast light spectrometry of the finger;
  and a photograph of the venous network of the finger by infrared which would capture the intrinsic emission of the finger.
The cryptographic module is configured to authenticate the user according to the vector image relating to said ultrasound of the venous and nervous networks of said finger, the measurement of a heart rate and the measurement of a blood pressure, the photograph of the venous network of said finger, the photograph of the fingerprint of said finger, and the spectrometry of said finger.

12 Claims, 12 Drawing Sheets

(51) Int. Cl.
  *G06F 21/32*     (2013.01)
  *H04L 9/08*      (2006.01)
  *H04L 9/14*      (2006.01)
  *H04L 29/06*     (2006.01)

(52) U.S. Cl.
  CPC ..... *G06K 9/00006* (2013.01); *G06K 9/00087* (2013.01); *G06K 9/00107* (2013.01); *H04L 9/0866* (2013.01); *H04L 9/14* (2013.01); *H04L 9/3247* (2013.01); *H04L 63/0428* (2013.01)

(58) Field of Classification Search
  CPC .. G06F 21/32; G06K 9/00006; G06K 9/0002; G06K 9/00087; G06K 9/00107
  USPC .......................................................... 713/176
  See application file for complete search history.

(56) References Cited

U.S. PATENT DOCUMENTS

| | | | | |
|---|---|---|---|---|
| 6,507,662 | B1* | 1/2003 | Brooks | G07C 9/37 382/115 |
| 8,855,376 | B2* | 10/2014 | Miura | G06K 9/00006 382/115 |
| 10,592,720 | B2* | 3/2020 | Lee | G06K 9/00288 |
| 2002/0030359 | A1* | 3/2002 | Bergenek | G06K 9/00087 283/68 |
| 2003/0004556 | A1* | 1/2003 | McDaniel | A61K 8/49 607/88 |
| 2003/0091724 | A1* | 5/2003 | Mizoguchi | G06K 9/00087 427/1 |
| 2003/0130709 | A1* | 7/2003 | D.C. | A61N 5/0619 607/88 |
| 2005/0185847 | A1* | 8/2005 | Rowe | G06K 9/00006 382/224 |
| 2005/0213798 | A1* | 9/2005 | Itoh | G06K 9/00026 382/124 |
| 2006/0016871 | A1* | 1/2006 | Bonalle | G06F 21/32 235/380 |
| 2006/0083408 | A1* | 4/2006 | Hoffman | G06Q 30/0222 382/115 |
| 2006/0120575 | A1* | 6/2006 | Ahn | G06K 9/00006 382/124 |
| 2007/0014437 | A1 | 1/2007 | Sato | |
| 2007/0177770 | A1* | 8/2007 | Derchak | G06K 9/00496 382/115 |
| 2007/0187587 | A1* | 8/2007 | Rowell | C01B 33/141 250/288 |
| 2008/0008365 | A1* | 1/2008 | Hikita | G06K 9/0002 382/124 |
| 2008/0304712 | A1* | 12/2008 | Rowe | G07C 9/00563 382/115 |
| 2008/0310690 | A1* | 12/2008 | Higuchi | G06K 9/00046 382/124 |
| 2009/0043180 | A1* | 2/2009 | Tschautscher | A61B 5/14552 600/323 |
| 2009/0214083 | A1* | 8/2009 | Sato | A61B 5/1172 382/107 |
| 2009/0279751 | A1* | 11/2009 | Schmitt | G06K 9/0002 382/125 |
| 2009/0318814 | A1* | 12/2009 | Kuratsune | A61B 5/0059 600/473 |
| 2011/0090541 | A1* | 4/2011 | Harper | G06F 21/32 358/474 |
| 2012/0016798 | A1* | 1/2012 | Carper | G06Q 20/1085 705/43 |
| 2012/0085822 | A1* | 4/2012 | Setlak | G06K 9/0002 235/439 |
| 2012/0177257 | A1 | 7/2012 | Maev | |
| 2012/0286931 | A1* | 11/2012 | Semba | G06K 9/6293 340/5.83 |
| 2012/0314048 | A1* | 12/2012 | Matos | G06K 9/00 348/78 |
| 2013/0147726 | A1* | 6/2013 | Dumont | G06F 3/0416 345/173 |
| 2014/0003680 | A1* | 1/2014 | Marciniak | G06K 9/00006 382/124 |
| 2014/0119617 | A1* | 5/2014 | Bertin | G06K 9/00892 382/116 |
| 2014/0226879 | A1* | 8/2014 | Westerman | G06K 9/00013 382/125 |
| 2014/0237256 | A1* | 8/2014 | Ben Ayed | H04W 12/0013 713/186 |
| 2014/0247115 | A1* | 9/2014 | Leclerc | A61B 5/1172 340/5.82 |
| 2014/0264030 | A1* | 9/2014 | Lin | G02B 6/136 250/338.4 |
| 2014/0294262 | A1* | 10/2014 | Schuckers | G06K 9/00114 382/125 |
| 2014/0354905 | A1* | 12/2014 | Kitchens | G06F 3/043 349/12 |
| 2015/0195278 | A1 | 7/2015 | Plotkin | |
| 2015/0286855 | A1* | 10/2015 | Neskovic | G06K 9/00073 382/125 |
| 2015/0356362 | A1 | 12/2015 | Demos | |
| 2016/0070968 | A1* | 3/2016 | Gu | G06K 9/00093 382/125 |
| 2016/0092665 | A1* | 3/2016 | Cowan | G06F 21/35 726/9 |
| 2016/0201147 | A1* | 7/2016 | Cao | C12Q 1/6858 506/4 |
| 2016/0217313 | A1* | 7/2016 | Cuti | G06F 3/0488 |
| 2017/0074885 | A1* | 3/2017 | Kobus | A61B 5/1171 |
| 2017/0086722 | A1* | 3/2017 | Shigenaga | A61B 5/02427 |
| 2017/0094018 | A1* | 3/2017 | Ekstrom | H04W 8/16 |
| 2017/0337414 | A1* | 11/2017 | Ohno | G01J 3/10 |
| 2018/0018499 | A1* | 1/2018 | Lei | G06K 9/00067 |
| 2018/0018501 | A1* | 1/2018 | Mather | G06K 9/00006 |
| 2018/0018838 | A1* | 1/2018 | Fankhauser | G06K 19/06046 |
| 2019/0089539 | A1* | 3/2019 | Dupont | G06K 9/00006 |

* cited by examiner

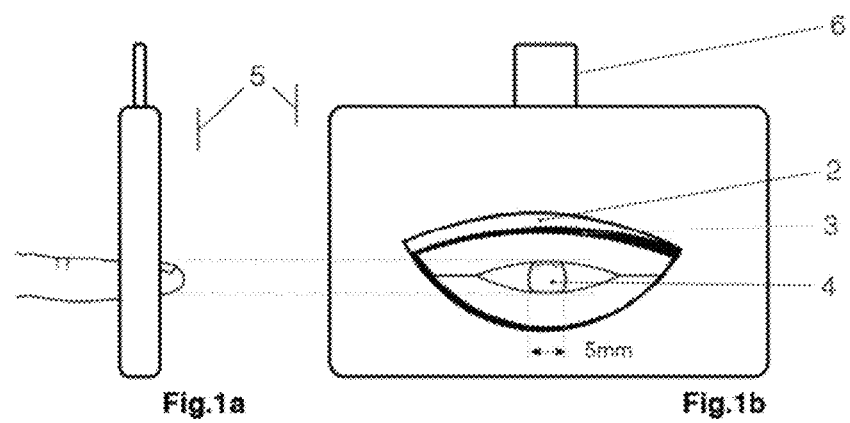
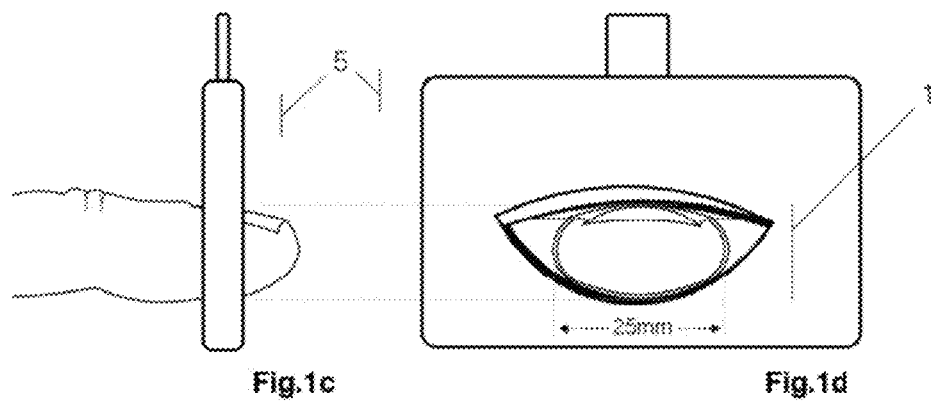
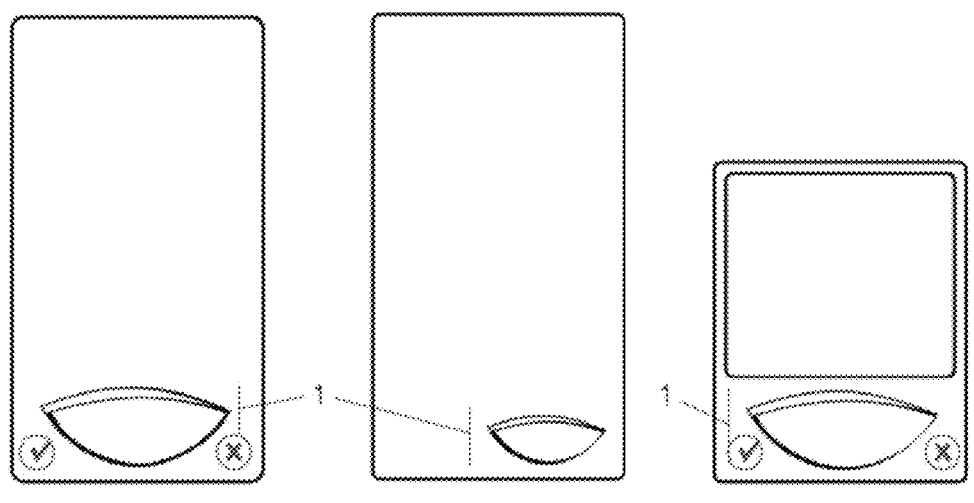
Fig.1a  Fig.1b  Fig.1c  Fig.1d
Fig.2a  Fig.2b  Fig.2c

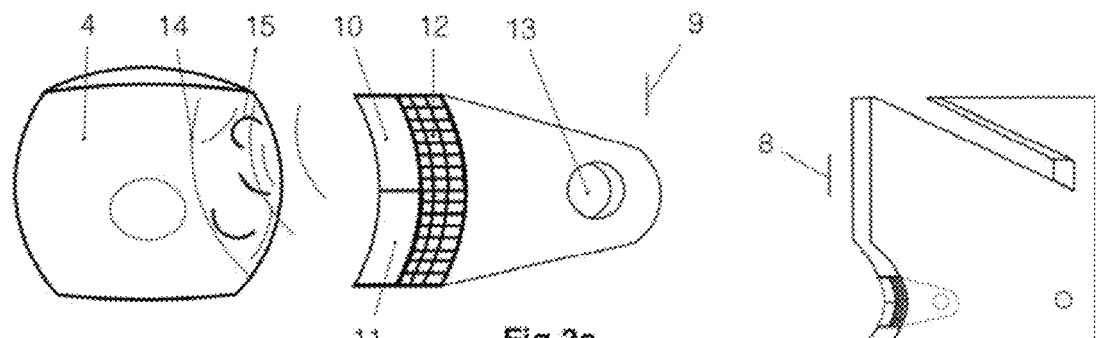
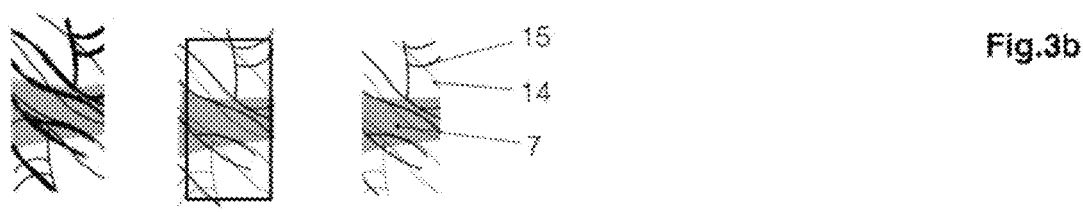
Fig.3a  Fig.3b  Fig.3c
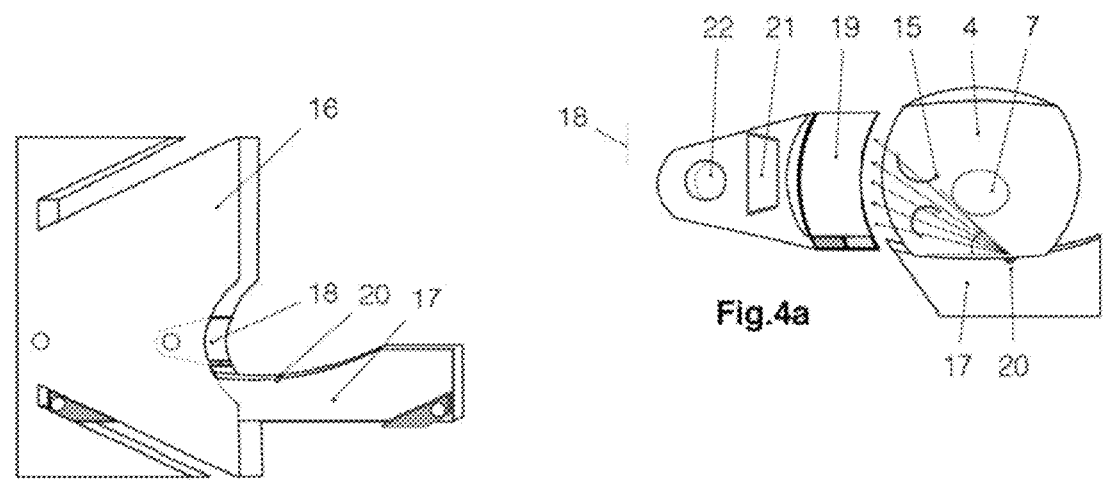
Fig.4a  Fig.4b
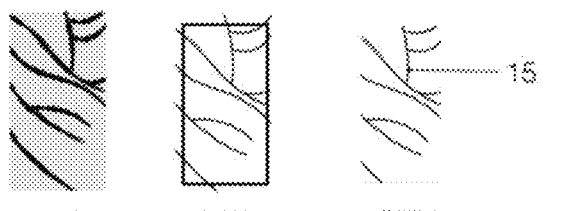
Fig.4c

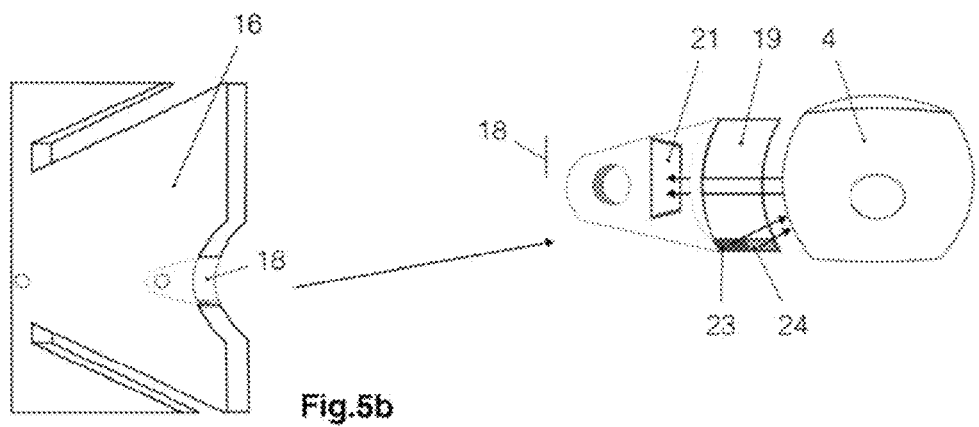
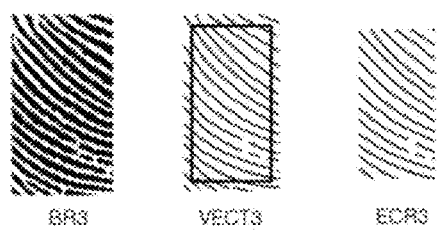
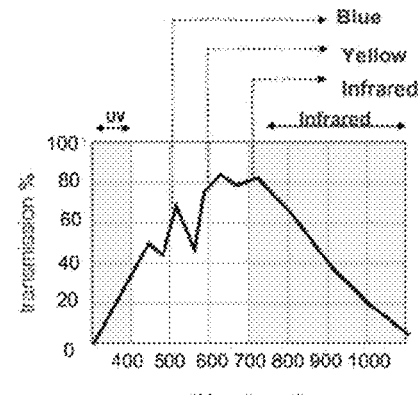
Fig.5a
Fig.5b
Fig.5c
Fig.5d
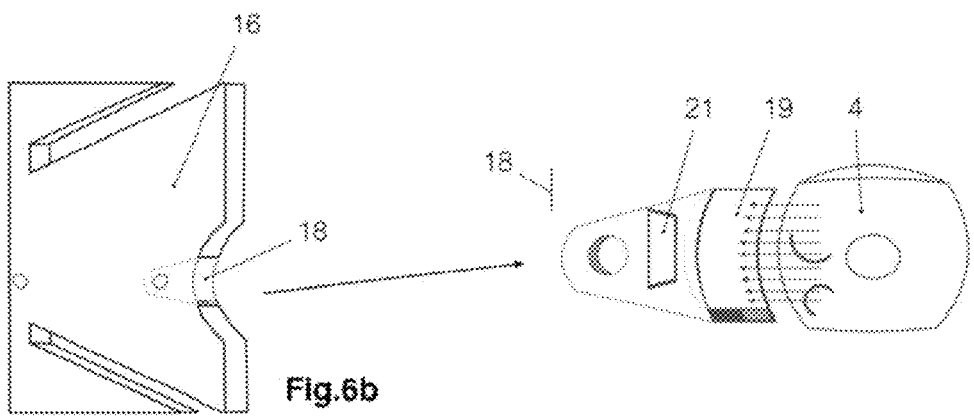
Fig.6a
Fig.6b
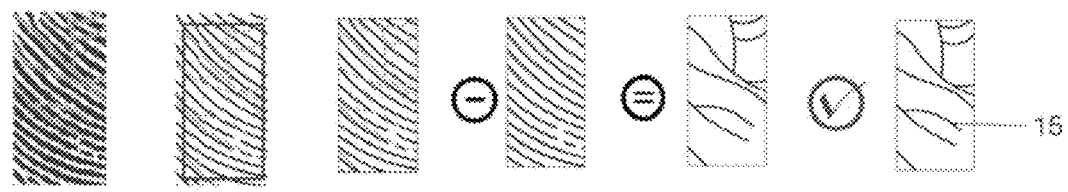
Fig.6c

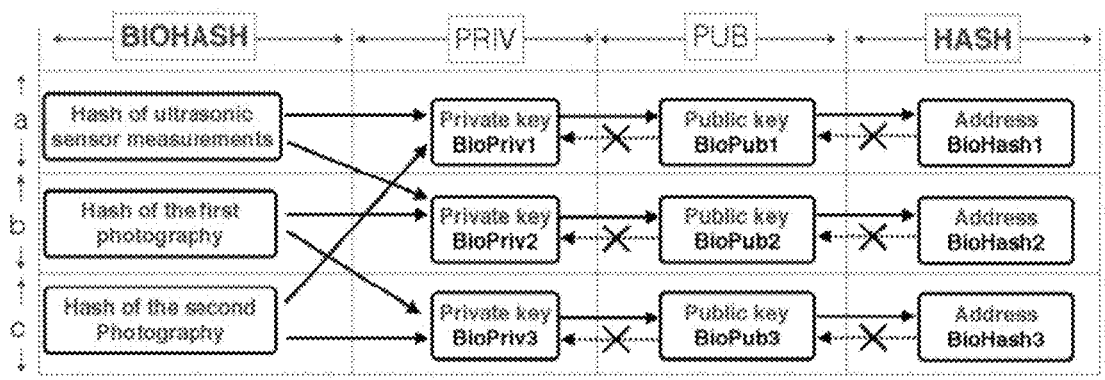
Fig.20
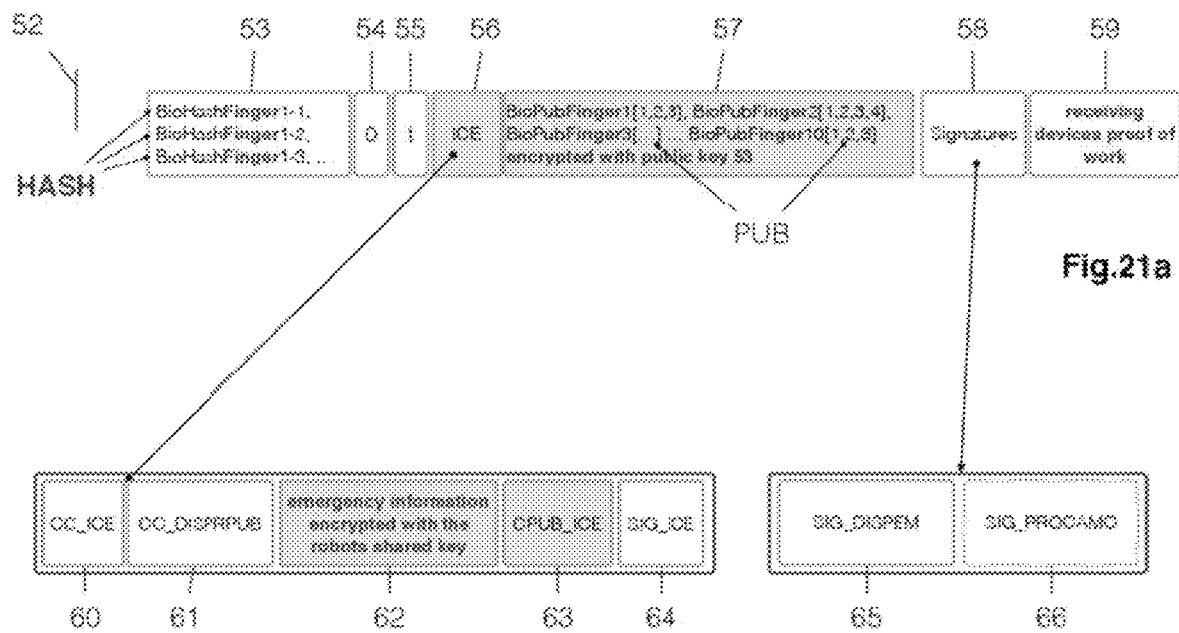
Fig.21a
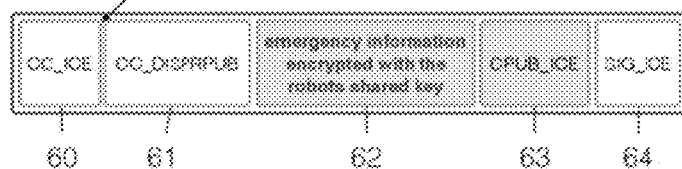
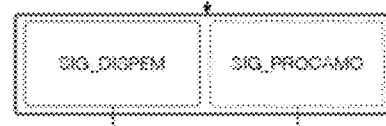
Fig.21b
Fig.21c
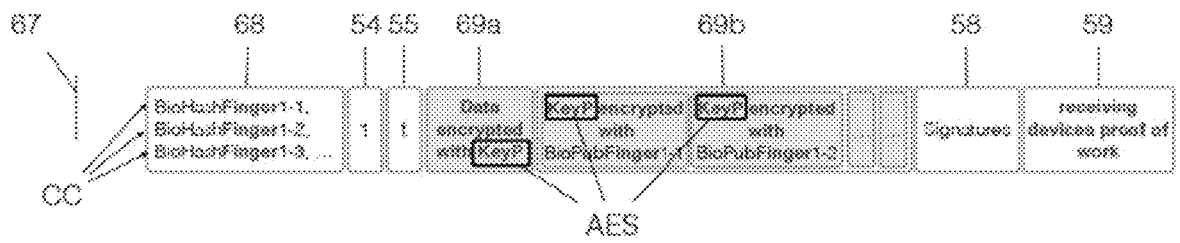
Fig.22

ADAPTIVE DEVICE FOR BIOMETRIC AUTHENTICATION USING ULTRASOUND, INFRARED AND CONTRAST VISIBLE LIGHT PHOTOGRAPHS, WITHOUT DISCLOSURE, VIA A DECENTRALISED COMPUTER NETWORK

INTRODUCTION

The present invention relates to the field of biometric authentication. More particularly, the invention relates to biometric authentication means, portable, particularly suitable for securing transactions, without disclosure, through a decentralized computer network.

Current biometric devices, such as fingerprint recognition systems integrated with mobile phones, have known limitations. In particular, it is possible to deceive these from reconstructed fingerprints, from a photograph for example.

Other devices to overcome these limitations are thus known. In particular, it is possible to make an impression of the venous network by means of an infrared photographic device. If the level of reliability and security is significantly improved, the necessary means are not suitable for mobile use, especially because of their size and relative fragility. In addition, they require a prior enrollment of the user, in order to gather the information necessary for the analysis of the venous network. On the other hand, these means do not provide effective protections concerning the physical security of the user, such as the removal of a finger, for example. These latter do not make it possible specifically to take into account the evolution or modifications of the user's morphology—growth, weight gain, edema, cuts, superficial or deep burns, etc.—, observed throughout his life.

This is why there is a need for biometric authentication means, portable, particularly adapted to secure transactions, without disclosure or prior enrollment, through a decentralized computer network, having a very high level of security, able to discriminate the vast majority of individuals, guaranteeing the physical security of the individual, and offering adaptability to the morphological evolutions of the individual observable throughout the life of the individual.

An object of the invention is to provide biometric, portable authentication means adapted in particular for securing transactions, without prior disclosure or enrollment, through a decentralized computer network, having a very high level of security, capable of discriminating against each other. The vast majority of individuals, guaranteeing the physical security of the individual, and offering adaptability to the morphological evolutions of the individual observable throughout the life of the latter. Another object of the invention is to provide means to make reliable and adapt to all sizes of fingers. Another object of the invention is to provide biometric and computer means having a very high degree of security and able to identify the vast majority of individuals. Another object of the invention is to provide biometric authentication means making it possible to dispense with any storage of the biometric keys or private keys of an individual to perform any type of computer transaction.

The invention particularly relates to an adaptive biometric authentication device by ultrasound, photography in visible light, infrared light photography and spectrometric analysis of the fingers. The invention also incorporates a correlation verification device for validating other biometric fingerprints. The device according to the invention is particularly intended for biometric authentication, having a particularly high level of reliability and security, of individuals, in order to carry out computer transactions through a computing device, such as a mobile phone, a computer or any other device likely to benefit from these authentication means, for example a lock of a car, a safe, a house, buildings or a border control device.

SUMMARY

Thus, an embodiment provides a biometric measurement device, characterized in that it comprises:
- a positioning module comprising a measurement zone, said positioning device being configured so as to allow a user to have at least one finger in the measurement zone;
- a calculation module;
- An ultrasound module, coupled with the calculation module, and configured to perform an ultrasound of venous and nervous networks of a finger after introduction of said finger into the measurement zone; and transmitting, to the calculation module, the biometric data relating to said ultrasound of the venous and nervous networks of said finger;
- A photographic module, comprising several light sources, coupled with the calculation module, and configured to produce, after the insertion of a finger into the measurement zone:
  - a first photograph of a venous network of said finger and by means of at least one infrared light source arranged so as to allow, once illuminated, the photographic module to make a photograph of the venous network of said finger, the infrared light source is arranged in a particular way to avoid the bone of the phalanx and transmit said venous network photography to the calculation module;
  - A second photograph of a fingerprint of said finger and by adding contrast light provided through coherent light sources having at least one wavelength between 400 nm and 800 nm; and transmitting said photograph of the fingerprint to the calculation module.

The calculation module being configured to generate biometric measurements specific to a user, following the introduction of one of said user's fingers into the measurement zone, according to said ultrasound of the venous and nervous networks of said finger, of the photograph of the venous network of said finger, the photograph of the fingerprint of said finger.

According to one embodiment, the ultrasound module further comprises a measurement module (11), coupled with the calculation module, and configured to measure and transmit to the calculation module, a measurement of a heart rate and a measurement of the heart rate. Blood pressure performed on a finger after introduction of said finger into the measurement zone.

According to one embodiment, the photographic module, coupled with the calculation module, is configured to make a photograph in infrared light of a venous network of a finger, without adding external light after the introduction of said finger, into the measurement zone; and transmitting said photograph of the venous network to the computation module.

According to one embodiment, the calculation module is configured to perform a spectrometric analysis of the second photograph of a fingerprint, by adding contrast light and transmit said spectrometric analysis to the calculation module. According to one embodiment, the positioning module comprises a stop and a blocking module configured to apply, after the introduction of a finger into the measurement zone, a pressure on said finger so as to block the nail of said finger against the stop, and temporarily constrain said finger to remain in a substantially fixed position in the measurement zone.

According to one embodiment, the calculation module is further configured to authenticate a user, following the introduction of one of said user's fingers into the measurement zone, only if the vector image relating to said network ultrasound venous and nervous of said finger, the measurement of a heart rate and the measurement of arterial pressure, the photographs of the venous network of said finger, the photograph of the fingerprint of said finger, and the spectrometry of said finger are considered as meeting a set of predefined compliance criteria.

According to one embodiment, the calculation module is configured to generate at least one vector image, clipped at its ends, of the biometric measurement relating to ultrasound (ECR1), biometric measurements relating to photographs in infrared light with (ECR2) addition of infrared light and the biometric measurement relating to the photograph of fingerprints by addition of contrast light (ECR3).

According to one embodiment, the calculation module is adapted to implement a cryptographic method of digital signature, encryption and decryption, the calculation module being configured for:
  after the insertion of a finger into the zone of measurements, determine at least one biometric control key from each clipped vector measurement resulting respectively from the ultrasound biometric measurement (ECR1), the first (ECR2) and the second (ECR3) photograph;
  determine three private identification keys (PRIVa) (PRIVb) (PRIVc) by calculating three two-by-two combinations of said biometric control keys (CCMESa) (CCMESb) (CCMESc);
  calculating three public identification keys (PUBa) (PUBb) (PUBc) relating to said three private identification keys;
  calculating three identification control keys (CCa) (CCb) (CCc) relating to said three public identification keys;
  transmitting, to the external device, said three public identification keys and said three identification control keys; or,
  sign and/or decrypt and/or encrypt information transmitted by the external device.

According to one embodiment, the calculation module is configured to identify a user, following the introduction of one of the user's fingers into the measurement zone and to transmit the identification control keys of said finger to a user. external device, only if:
  the measurement of the arterial pressure is below a predetermined threshold; and/or
  the measurement of the heart rate is below a predetermined threshold.

According to one embodiment, the calculation module is configured to record at least a second finger of the same individual, from the collected biometric data only if these are considered to meet a set of predefined compliance criteria.

According to one embodiment, the calculation module is configured to make it possible to define in the form of at least three previously registered finger identification control keys of a given individual:
  a finger enabled to activate a finger;
  alert;
  a finger enabled to disable an alert;
  a finger entitled to a common use;
  at least one additional finger previously recorded makes it possible to recover the data of said individual according to predefined conditions.

According to one embodiment, the calculation module is configured to certify an individual as unique if said individual has recorded at least six fingers through at least one device (5).

According to one embodiment, the biometric device (5) is integrated inside a telephone, in a format for performing biometric measurements for fingers of different sizes (2a) (2b), integrated (2a) (2b) or not (2c) in the phone screen.

BRIEF DESCRIPTION OF THE FIGURES

Other features and advantages of the present invention will become apparent from the following description of embodiments, with reference to the accompanying drawings, in which:
  FIG. 1a schematic profile view of a biometric device according to an embodiment of the invention, when a 5 mm large finger is inserted;
  FIG. 1b schematic front view of a biometric device according to one embodiment of the invention, when a 5 mm wide finger is inserted;
  FIG. 1c schematic side view of a biometric device according to one embodiment of the invention, when a 25 mm wide finger is inserted;
  FIG. 1d is a schematic front view of a biometric device according to one embodiment of the invention, when a 25 mm wide finger is inserted;
  FIG. 2a schematic view of a biometric device according to one embodiment of the invention, integrated with a telephone whose screen is disposed all around said biometric device;
  FIG. 2b schematic view of a biometric device according to one embodiment of the invention, integrated with a telephone adapted to small fingers;
  FIG. 2c schematic view of a biometric device according to an embodiment of the invention, integrated with a telephone having a small screen;
  FIG. 3a schematic view of an ultrasonic sensor (9) according to an embodiment of the invention;
  FIG. 3b schematic view of the integration of the ultrasonic sensor (9) on a support (8) of the biometric device (5) according to one embodiment of the invention;
  FIG. 3c representation, respectively, of the raw (BR1), vector (VECT1) and clipped (ECR1) results obtained using the ultrasonic sensor (9);
  FIG. 4a schematic view of an infrared photographic sensor (18) by finger transparency from the infrared source (20) according to one embodiment of the invention;
  FIG. 4b schematic view of the integration of the photographic sensor (18) on the support (16) and the infrared source (20) on a support (17) of the biometric device (5) according to one embodiment of the invention;
  FIG. 4c Representation, respectively, of the raw (BR2), vector (VECT2) and clipped (ECR2) results obtained using the photographic sensor (18);
  FIG. 5a schematic view of a photographic and spectrometric sensor (18) from the light sources (23) and (24) according to an embodiment of the invention;
  FIG. 5b schematic view of the integration of the photographic sensor (18) and the light sources (23) and (24) on a support (16) of the biometric device (5) according to one embodiment of the invention;

FIG. 5c representation, respectively, of the raw (BR3), vector (VECT3) and clipped (ECR3) results obtained using the photographic sensor (18);

FIG. 5d spectrometric analysis of first, second, and third photographs;

FIG. 6a schematic view of an infrared photographic sensor (18) by intrinsic infrared emission of the finger (4) according to one embodiment of the invention;

FIG. 6b schematic view of the integration of the photographic sensor (18) on the support (16) of the biometric device (5) according to one embodiment of the invention;

FIG. 6c representation, respectively, of the raw (BR4), vector (VECT4), clipped (ECR4), subtracted from (ECR3), resulting (RES), and compared (COMP) results obtained using the photographic sensor (18);

FIG. 19d Diagrammatic view of the wired connector (51), respectively in sectional, front, bottom, and top views and with the various USB connectors: USB-A, Lightning, Micro-USB and USB-C, same in front view and from above according to one embodiment of the invention;

FIG. 20 schematic view of the cryptographic key calculation mechanism from the biometric measurements made by the device (5) according to one embodiment of the invention;

FIG. 21a schematic view of the contents of the relative registration message of an individual's finger;

FIG. 21b schematic view of the contents of the emergency message (56) according to one embodiment of the invention;

FIG. 21c schematic view of the content of the signature (58) of a message according to one embodiment of the invention;

FIG. 22 schematic view of the content of the message containing the data relating to an individual according to one embodiment of the invention;

DETAILED DESCRIPTION

Figure 7:
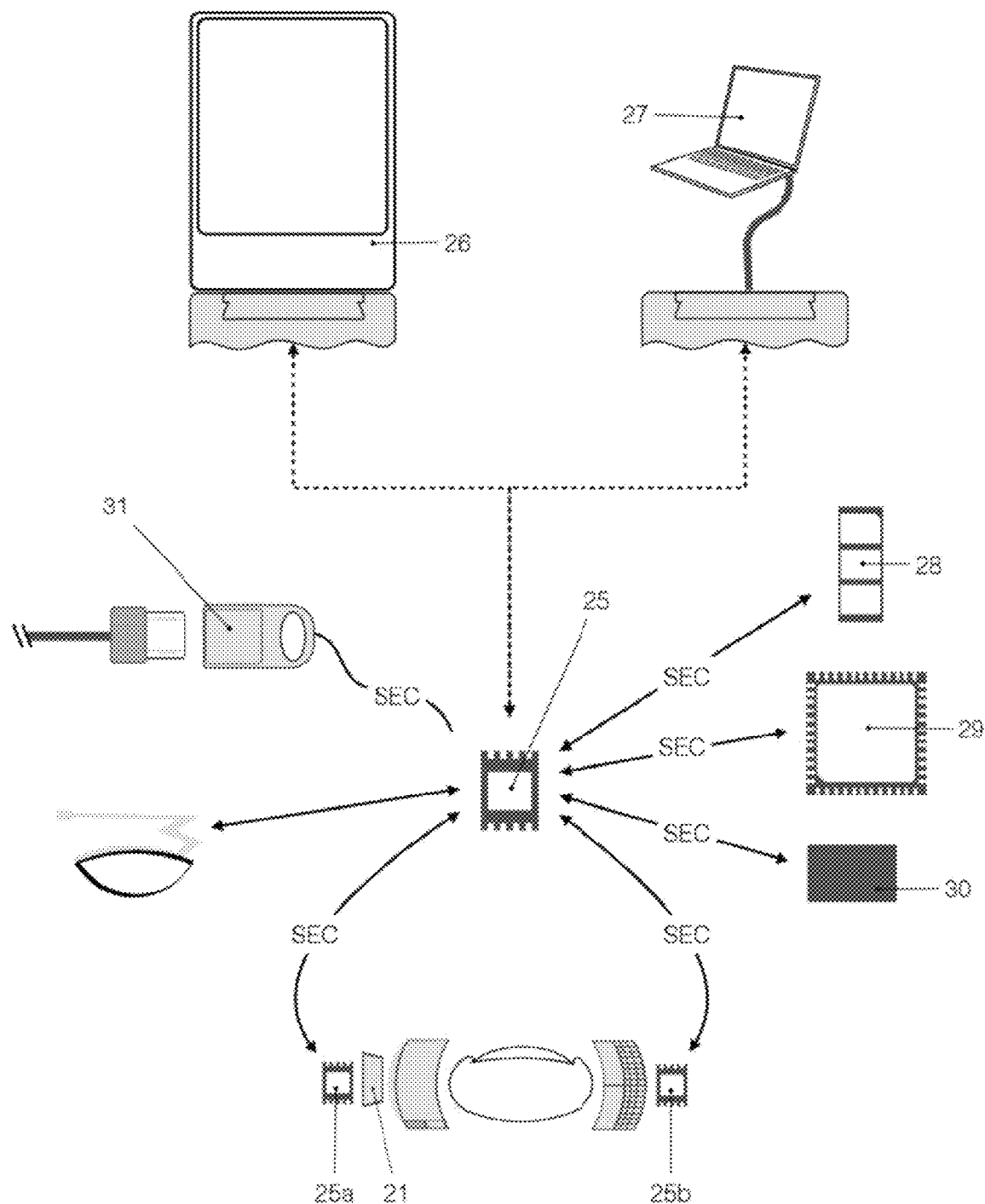
FIG. 7 schematic view of the communications between the different active components of the device (5) according to one embodiment of the invention.

Referring in particular to FIGS. 1a, 1b, 1c and 1d, a device (5) according to one embodiment of the invention will now be described. FIGS. 1a, 1b, 1c, 1d, 18a and 18b show an assembled view of the device (5).

The device (5) is intended to be integrated in a smartphone—more generally referred to by the English term "smartphone". The device (5) comprises for example a connector (50) capable of enabling coupling with a smartphone host terminal (26), computer (27) or any other computing device, for example via a connector of USB type ("Universal Serial Bus"). The dimensions of the device (5) are chosen so as to be both the smallest possible, but also able to allow the identification, regardless of the size of the finger (reference 4 in the figures) the width of a finger under relative pressure typically being between 5 mm and 25 mm. In the embodiment illustrated in the figures, excluding connectors (50) and (51)—the width of the device is substantially 55 mm, the height, substantially 34 mm, the thickness substantially 4.95 mm. Each of the components of the device (5) has been designed for easy mounting and disassembly. The device (5) allows the vast majority of individuals to be able to authenticate and generate messages via this device. Generally, the device is intended to be used with the left index to authenticate. Nevertheless, the device also works with any finger of the hand and for some cases with the toes.

Alternatively, as shown in FIGS. 2a, 2b and 2c, the device (5), by its small size, can be integrated inside mobile phones.

Figure 8A:
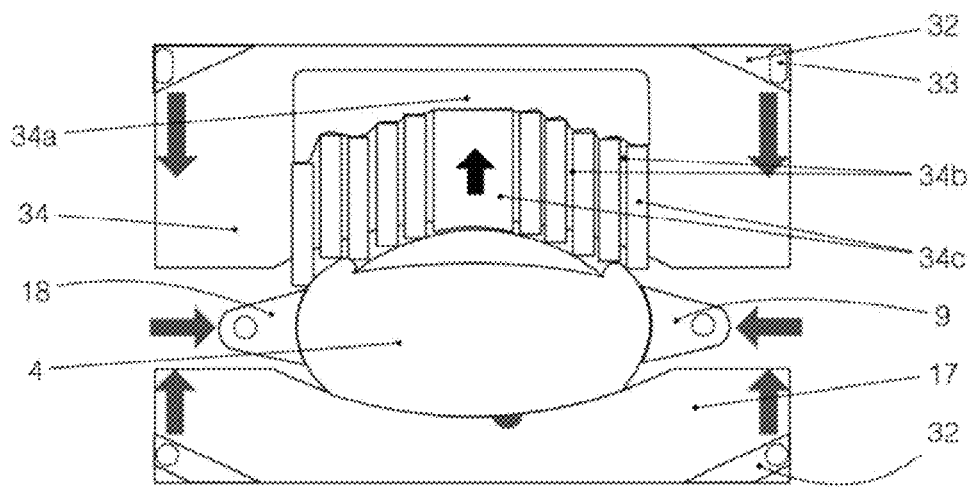
FIG. 8a Schematic view of the finger positioning mechanism consisting of a series of pistons (34c), a series of walls (34b) allowing the pistons (34c) to slide, a pocket of liquid (34a). connected to the pistons (34c), two sliding elements (34) and (17) positioning according to one embodiment of the invention.

The device (5) comprises:
a positioning module—FIG. 8a—comprising a measuring zone so as to allow a user to reproducibly position at least one finger in the measurement zone;
a calculation module (25);
A first ultrasonic module (12) adapted to perform a high-precision ultrasound of the venous and nervous network of said finger in the measurement zone; and transmitting, to the calculation module, the biometric data relating to said ultrasound of the venous and nervous networks of said finger;
a second ultrasonic module (11) adapted to perform a measurement of the heart rate and blood pressure;
A third ultrasonic module (10) adapted to emit ultrasound whose echoes are measured by the first and second ultrasonic modules;
a photographic module (18), comprising several light sources, coupled with the calculation module, and configured to produce, after the insertion of a finger into the measurement zone:
  a first photograph of a venous network of said finger and by means of at least one infrared light source (20) arranged so as to allow, once illuminated, the photographic module to take a photograph of the venous network of said finger, the infrared light source is arranged in a particular way to avoid the bone phalanx—FIG. 4a; and transmitting said photograph of the venous network to the calculation module; converted into a vector image by the calculation module;
  a second photograph, FIG. 5a, of a fingerprint of said finger with addition of contrast light provided by means of at least one light diode (23) and (24) having a wavelength between 400 nm and 800 nm, and transmit said photograph of the fingerprint to the calculation module;
  A third photograph in infrared light and without the addition of an infrared light source, FIG. 6a, between 800 nm and 1 mm, of a venous network of said finger, after the introduction of a finger into the measuring zone, using infrared radiation specific to said finger;
  A spectrometric analysis of the first, second and third photographs—FIG. 5d—;
  a differential analysis of the first, second and third photographs—FIG. 6c—;
the calculation module being configured to generate biometric measurements specific to a user, following the introduction of one of the fingers of the said user into the measurement zone, as a function of the ultrasound of the venous and nervous networks of said finger; photography of the venous network of said finger, the photograph of the fingerprint of said finger;
a mechanical device described in FIGS. 8a, 8b, 8c making it possible to guarantee the reliability and reproducibility of the measurements;
a removable cryptoprocessor (28) for adding extra authentication level to the device (5).

FIG. 3a shows the ultrasonic sensor (9), of high precision, suitable for performing an ultrasound of the venous and nervous networks, converted into a vector image. The vector modeling of the finger—shown in FIG. 3c—is the most accurate element of the device. Thanks to the hypersonic frequency ultrasonic waves—typically of the order of 13 MHz, the ultrasonic receptor transducer array (12) makes it possible both to distinguish the superficial venous network (15), but also the neural network (14) from the distal phalanx. It should be noted that the physical properties of ultrasound require direct contact with the skin of the individual. The ultrasonic sensor (9) includes a concave ultrasonic transmitter transducer (10) configured to resonate at a frequency of substantially 13 MHz. The ultrasonic transducer (10) is substantially 3.5 mm in height and 1.5 mm in width. This specific size allows the ultrasound emitted by this probe to remain in the Fresnel zone and to avoid any diffraction phenomenon up to the bone (7) of the distal phalanx. The concave ultrasound probe (10) is configured to continuously emit ultrasound at a frequency of substantially 13 Mhz, said ultrasound being intended to be analyzed by a concave ultrasound receptor probe (11) and a network (12) having thirty-two ultrasonic receptor transducers.

The concave ultrasonic receiver probe (11) has substantially dimensions 3.5 mm in length and 1.5 mm in width. It is configured to analyze by Doppler effect the blood pressure of the blood flow and the heart rate of the individual. These dimensions allow it to analyze the flow globally on the lateral part of the finger. The concave ultrasound receptor probe (11) also makes it possible to start taking measurements once the movement of the finger is stopped, but also end measurement at the reception of the second peak of the cardiac rhythm.

The array of ultrasonic receptor transducers (12) typically comprises thirty-two ultrasonic receptor transducers dimension 0.8 mm to 0.7 mm capable of providing an ultrasound image of the lateral portion of the distal phalanx. The ultrasound image of the lateral portion of the distal phalanx, converted to a vector image, can thus be used as the first part of two of the three cryptographic keys—FIG. 20—(COMES-a). This high-precision ultrasound allows complete visualization of the venous and nervous network of the finger.

The ultrasonic sensor (9) is particularly advantageous in that:
  it makes it possible to mix the sizes of the sensors;
  The size of the probes makes it possible to avoid parasites;
  the mechanism allowing both precise positioning of the finger, but also a constant and reproducible pressure between the transducers and the skin of the individual at this hypersonic frequency, any empty space would make it impossible to take measurements;
  The separation of the emitter and receiver transducers allows both a continuous measurement in the device, but also to be able to separate the measurement of the arterial pressure by Doppler effect and the ultrasound itself without introducing any noise into the device.

FIG. 3b illustrates an embodiment of the integration of the ultrasonic sensor (9) into a support (8) of the device (5). Measurements of the heart rate and blood pressure of the individual are made by the concave ultrasonic receptor probe (11) excited by the concave ultrasound probe (10). Since the concave ultrasound probe (10) continuously emits an ultrasonic wave, the ultrasonic sensor (11) measures the time between two peaks of blood pulsations, which is also the time required for taking the biometric measurements. The Doppler blood flow measurement is not located in a particular vein, but on the whole of the superficial venous network of the distal phalanx. Biometric measurement begins only in case of immobility of the finger: indeed, any movement of the finger in the device would create such a peak that any measurement would be unusable. Thus, it is possible to ensure, in addition to the finger locking mechanism, that the user's finger is immobile during the duration of a heartbeat.

FIG. 4a shows the photographic sensor (18) able to take a photograph of the lateral venous network by infrared transparency by means of an infrared light-emitting diode (20) avoiding the bone (7) of the phalanx, converted into a vector image. The photographic sensor (18) consists of a photographic sensor (21), a converging meniscus (19) and an infrared light emitting diode (20). The photographic sensor (18) is positioned in a very specific way, to translate the image produced by a vector fingerprint of the venous network (15), but also to exclude the bone (7) from taking the measurement. The photographic sensor (18) makes it possible to use only an extremely small area of the finger. As shown in FIGS. 4a and 4b, the infrared light emitting diode (20) is disposed on the lower portion of the device (5) at an approximate angle of 45° to the center of the distal phalanx bone (7). The photograph used to generate the vector image shown in FIG. 4c is made by the photographic sensor (18) also used for the lateral fingerprints, the spectrometric analysis of the fingerprints and for the analysis of the venous network by using the intrinsic radiation of the finger (4).

FIG. 5a shows the photographic sensor (18) capable of taking a photograph of the lateral fingerprints coupled with contrast light spectrometry. The photographic sensor (18) comprises a CMOS photographic sensor (21)—"CMOS" for "complementary metal-oxide-semiconductor"—a converging meniscus (19), a light-emitting contrast diode, for example yellow (24) and a blue contrast light-emitting diode (23). The photographic sensor (18) is configured to produce a contrast light for detecting a double skin by spectrometric analysis of the photographic sensor (21). Thus, the lateral imprints are much more difficult to obtain, because they are not left on the objects affected and very rarely exploitable from a photograph. The resolution of the photographic sensor (21) is also much greater because of the small size of the photographed area, especially since the light input is made by the light-emitting diodes (23) and (24) which illuminate by transparency of the skin the photographic sensor (21). The photographic sensor (18) provides a contrast light photograph of the finger's fingerprints—the blue and yellow colors being particularly well processed by the photographic sensor (21). In order to allow an exploitable spectrometric analysis by the photographic sensor (21), the device incorporates two light-emitting diodes (23) and (24) in the visible wavelength range. Said light-emitting diodes which emit at a fixed and stable wavelength, also called the coherent wavelength, make it possible both to provide the necessary light by transparency to the photographic sensor (21), but also to carry out an analysis. spectrometric—FIG. 5c—which differs between each color (amount of melatonin) and skin thickness. The type of camera used may be the same as that used in mobile phones (CMOS) with the advantage of integrating both the sensors, but also the components for image processing.

Since the wavelength of the infrared radiation of the human body is of the order of 10 μm, it is generally eliminated by a low-pass filter also called blocking filter on the photographic sensors directly at the level of the lens. Concerning the photographic sensor (18), this filter is deleted in order to be able to recover these data and thus to allow the process of reliability and validation of the concordance of the measurements made on the fingerprints and on the measurement of the venous network—FIG. 6c.

One of the advantages of the invention is to make all measurements reliable, irrespective of the size of the fingers, but also regardless of the evolution of this size, especially during periods of growth.

The device previously described in FIG. 8a shows in real-life conditions the stresses applied to the pistons (34c) of silicone 25 thus making it possible to block the nail of the finger by using the irregularities of the distal edge of nail plate. This piston system in addition to forcing the finger to remain in a fixed position during the measurement, also allows and naturally refocus said finger through the movements of these pistons. These pistons (34c) which bathe in Teflon oil never come into contact with the skin 30 of the individual, the entire device being enclosed in a silicone membrane (36) particularly thin and elastic.

Figure 8B:
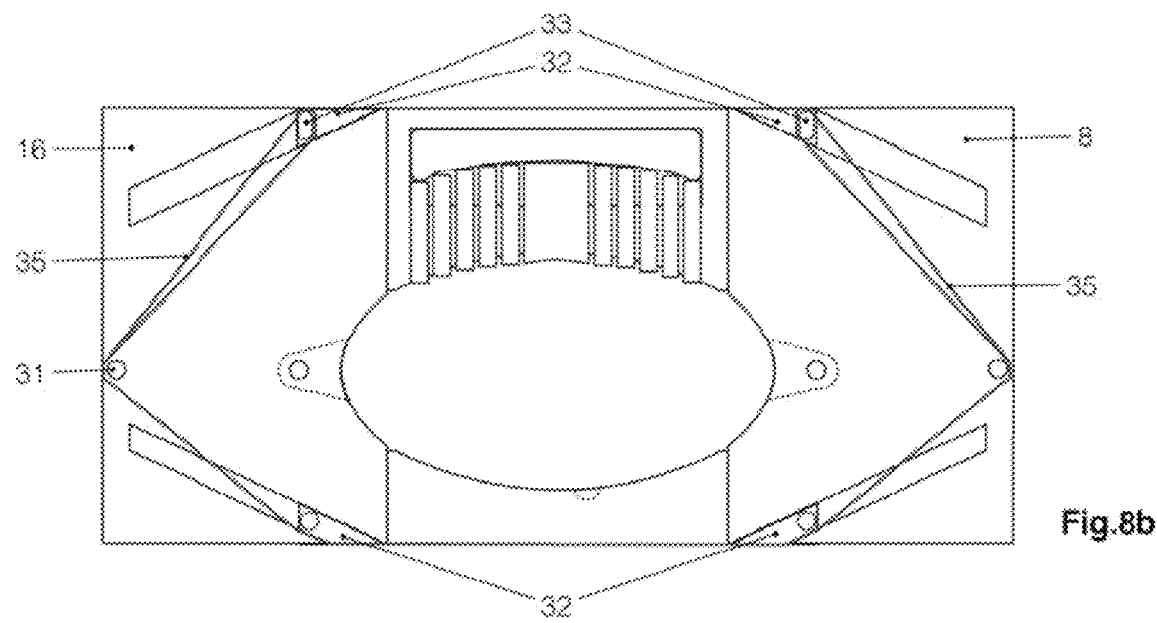
FIG. 8b schematic view of the actual positioning device in open position incorporating the pressure elastic (35) according to one embodiment of the invention.
Figure 8C:
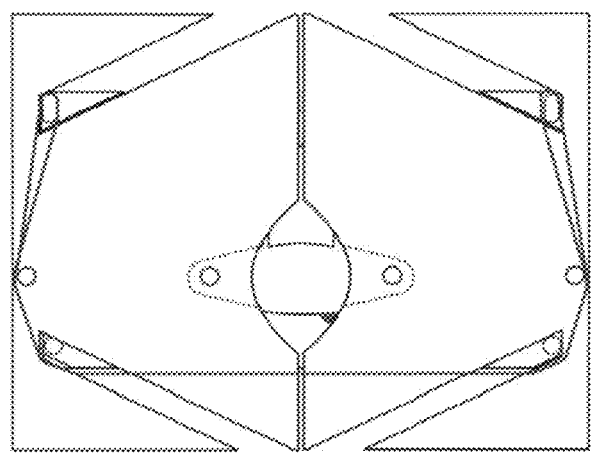
FIG. 8c schematic view of the actual positioning device in closed position incorporating the pressure elastic (35) according to one embodiment of the invention.

The diagrams shown in FIGS. 8b and 8c respectively, describe the state of the device in the maximum and minimum opening position. The movement of the four components is entirely constrained by the presence of the lugs (32) which impose a defined height for each finger width. The pressure of the device and the return to the state of rest in FIG. 8c are generated by the tension of the elastic (35), itself secured to the device by means of pins (33). also used to attach the upper front and rear diaphragms.

The cryptoprocessor (25) is the orchestra master of the various components of the device. Indeed, through the protocol I²C—Inter-Integrated Circuit—it will control, sequence the actions of the components: Sensors, LEDs, removable cryptoprocessor, memory, 433 MHz network module, in order to recover the cryptographic keys, and then communicating with the host terminal and the decentralized network in which the data is stored—smartphone (26), computer (27), computing device—to communicate encrypted transactions to it, decrypt the received messages, sign and encrypt the transactions to be transmitted which have been asked of it.

As in the diagram shown in FIG. 7, all of the cryptographic methods can be summarized as the only communication between the host terminal and the cryptoprocessor (25). The cryptoprocessor communicates directly with the other biometric components of the system via the I²C data bus of which it is the master. Finally, and still by this data bus the cryptoprocessor uses the removable cryptoprocessor (28) to add a third level of authentication to the system, so that all or part of the transactions of an individual can be limited to the device (5) having the said removable cryptoprocessor.

For USB communication, the cryptoprocessor uses a UART-Universal Asynchronous Receiver Transmitter (UART) microcontroller in which it retrieves instructions from the host system and transmits the encrypted and signed transmissions. An EEPROM (30)—Electrically-Erasable Programmable Read-Only Memory—is used as a data cache and can be seen as the only real exchange interface between the host system and the device.

Figure 12:
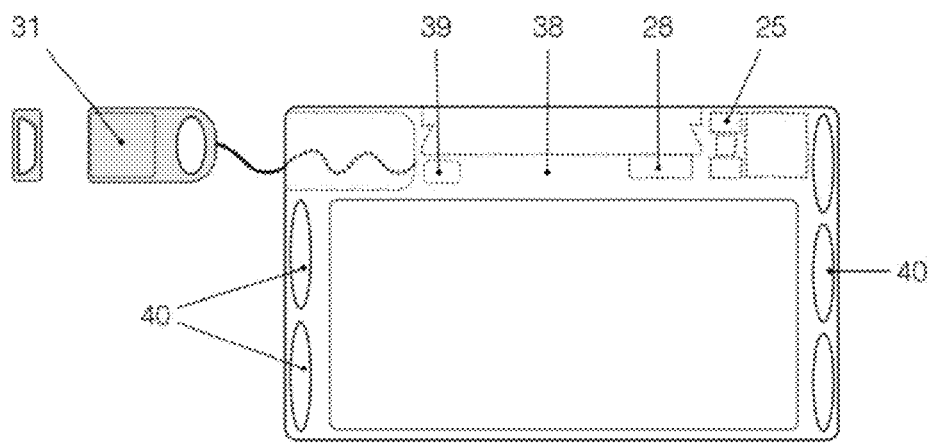
FIG. 12 schematic view of the internal housing of the device (5) in which will be added to the components of FIGS. 10 and 11, this figure also shows the USB female connection device (31) according to one embodiment of the invention.

For each message deposited by the smartphone or the computer on this memory area—specific directory, the central cryptoprocessor generates and signs the transaction and stores it in turn on another directory of this memory zone, the phone or the computer itself. Then instruct to send the encrypted and signed message to the receiving devices (70). In "networkless" transactions, this memory area serves as storage for the various operations. The device (5) further integrates a second removable female USB connection (31) thus making it possible to connect other USB devices or a power cable that can also be used to supply electricity to the host system via the device (5). FIG. 12 illustrates an embodiment of the integration of the female USB connector (31) in a carrier (38) of the device (5).

To ensure a minimum impact on the environment the device is designed to improve the robustness—shock, torsion, immersion IP67, heat, cold—but also to be thrown in the garbage without adding plastics and materials harmful to the environment.

The entire device is made of silicone with several levels of elasticity. The case is made of bamboo fiber and natural resins lacquered on the outside. The case is also designed to be easily replaced in case of deterioration. None of the materials, electromagnetic and ultrasonic fields, as used in the device, have ever been incriminated in health problems. Finally, the device has a specific connector that allows both to prevent water and moisture from entering the device as well as to protect the phone from any damage to its USB connector.

The authentication keys are not calculated and then stored as can be seen in traditional systems. In the device according to the invention, the cryptographic private keys are never stored either on the device or in the databases on the decentralized network. Each time a finger is inserted, the device generates the three private keys (PRIVa, PRIVb and PRIVc) or more precisely the three computations created by taking a pair of control keys per computation related to the biometric measurements (CCMES1, CCMES2 and CCMES3)—FIG. 20—. Private keys thus generated will then calculate the public keys (PUBa, PUBb and PUBc) and the control keys (CCa, CCb and CCc), which are the hashes of public keys, thus making it possible to retrieve the data of the individual in the databases of said keys control. The recovered data being encrypted with the three public keys, can therefore be automatically decrypted by the device that has the private keys. Thus the device never needs to store either the measurements or the private keys outside the biometric measurement itself. The use of biometric data as a cryptographic key is an innovation.

The cryptographic algorithm used by the device is the ECDSA—Elliptic Curve Digital Signature Algorithm—although this invention does not exclude the use of other cryptographic algorithms. Indeed this one being particularly resistant, it is the privileged algorithm. The public keys and control keys are automatically generated from the private keys. It should be noted that the calculation is considered impossible from the public key and even less possible for the control key which is only an irreversible imprint of the public key. To make the system inviolable, the system is based on temporary keys replaced as soon as the public key is unveiled—the control key, the public key and a message signed by the private key are sufficient to prove the possession of the private key and therefore the ability to perform transactions and generate messages on the associated control key. To make the system tamper proof, the private and public biometric keys never leave the device, no hardware or software device, is therefore considered reliable—smartphones, computers, etc.—unlike the device itself. Also, because privacy is an integral part of security, all transaction correlation elements are excluded from the device, except for certain smart contracts or "smart-contracts" required to execute alert messages or "credit" transaction validations. The control key calculation algorithm used is the 256-bit encoded SHA-256 unlike the RI PEMD-160 algorithm used to generate bitcoin addresses. The first advantage is a better security provided by the SHA-256 algorithm, but also, and most importantly, this control key algorithm is directly integrated with almost all cryptoprocessors. Control keys are virtually the only unencrypted information of the device and these processes, hence the importance of avoiding address collisions, with a greater number of possible control keys than for the bitcoin network.

Figure 23:
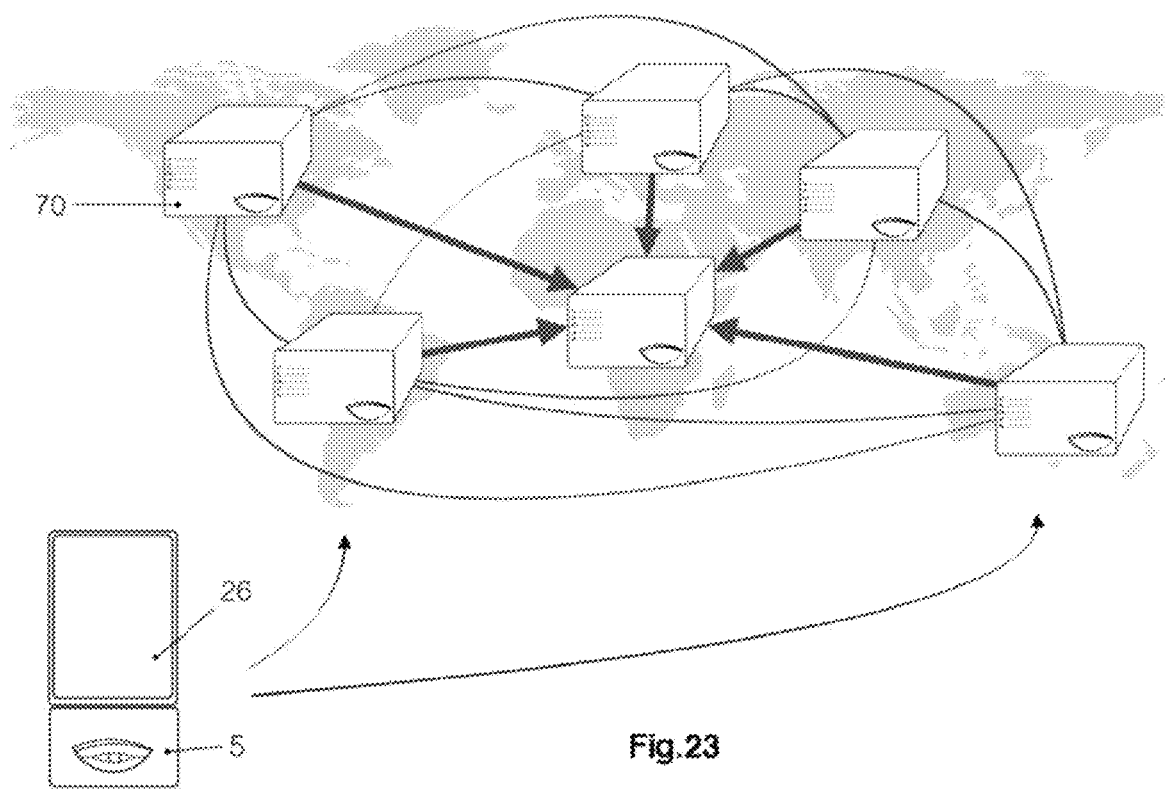
FIG. 23 schematic view of the integration of the device (5) on a telephone (26) in a peer-to-peer network of receiving devices (70) according to one embodiment of the invention.
Figure 24:
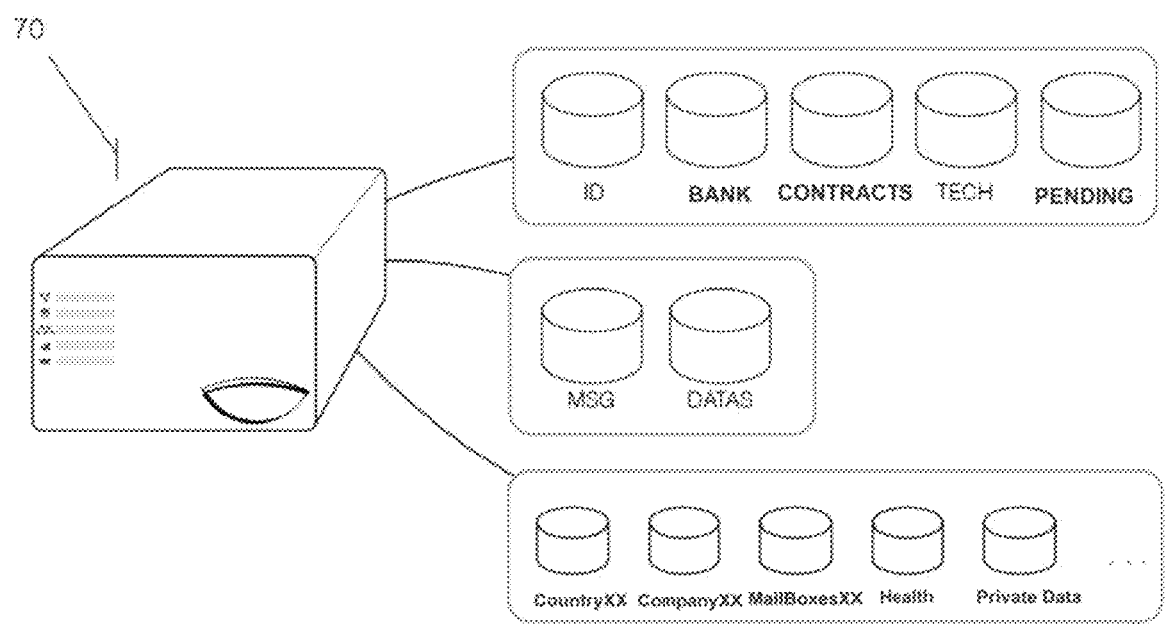
FIG. 24 schematic view of the databases contained on the receiving devices (70) according to one embodiment of the invention.

FIGS. 21a and 22 describe the two basic transactions within the message chain on which it is stored. The messages (52) and (67) are the central points of the data stored on the message strings for a given individual, they allow the historization of the biometric public keys, the monitoring of the vital signs of the individual and the historization private keys that will be used to generate messages and others. This data is stored through messages stored in message strings themselves stored in several "column-oriented" NoSQL databases which itself are stored through a decentralized peer-to-peer network. As shown in FIGS. 21a and 22, with each new finger presented to the device (5), the latter is registered in a database relating to the identity data (ID)—FIG. 24 and create a new registration (52), here is the detail of the content of the message (52) issued in the common case:

(53): this sequence integrates the control keys (CCa, CCb and CCc) computed by the keys resulting from the biometric measurements as described in FIG. 20 and allow the device (5) to retrieve all the transactions of an individual from the previous connections of a given individual, it should also be noted that after an individual has recorded a new finger in the device (5), it is then possible for him from another message (52) to regain access to the data even after the common finger is damaged;

the reference (54) makes it possible to type the transactions, in this case "0" signifies that the transaction is of the type relating to the recording or updating of the biometric data of a finger;

The cell (55) indicates the date of the generation of the message;

the cell (56) contains the information designated by the English and international acronym "ICE" for "In case of Emergency" encrypted with a key common to the receiving devices—FIG. 23—(70) which allows the person (owner of ICE) via the device (5) and via a receiving device (70) a mechanism to protect private ICE data by restricting access only to the authorized persons. These data to be used especially by the first aid services if however the individual agrees;

The cell (57) contains the complete list of public keys (PUBa, PUBb, and PUBc) resulting from the previous connections of a given individual and for the entirety of the previously recorded fingers. These public keys are encrypted using the public keys corresponding to the addresses (53) mentioned, which allows the device (5) to find all the previous transactions (67) and thus to find the content, whatever the finger used;

The cell (58) integrates the signature (65) of the device (5) in order to render this transaction irrevocable and immutable by the device (5) on the one hand, and also by the receiving devices (70). This cell optionally integrates the signature (66) of the removable cryptoprocessor (28).

As shown in FIG. 22, here is the detail of the content of the transaction (67) issued in the common case:

the reference (68) technically materializes the common finger used by a given individual on the device (5).

Indeed, the control keys (CC) mentioned are those of the common finger, and allow not having to browse the messages (52) to find the transaction (67). It should also be noted that the number of control keys (CC) is not limited in order to guarantee the adaptability of the device throughout the life of a given individual;

the reference (54) for typing the transaction: "1" signifies that the transaction contains, on the one hand, the encrypted individual data (69*a*), on the other hand, the key (AES) making it possible to decrypt the data;

the cell (55) indicates the date of the generation of the message;

the reference (69*a*) contains the data encrypted with the key (AES) relative to the individual, the key (AES) is a symmetric or asymmetric key generated randomly by the device (5) and is renewed at each transaction, following is the content of encrypted data:

Biometric Common Data:
- Biometric Public Key History (PUB);
- Independent logging on each of the ten fingers;
- The last two biometric public keys different from those already recorded and which will be used for the device learning and adaptability mechanism (5);
- Heart rate and blood pressure (overall averages+last three measurements) that will be used to verify that the individual is not in a state of alert;
- The configuration of the alert contract of the person—to be executed if the conditions of the alert contract are met;
- Public keys of the common finger (allowing normal transactions on the device (5)) are addressed in (68);
- Public keys of the alert finger;
- Public keys of the alarm deactivation finger.

Data relating to the active digital identities of the individual:
- Unique identity, digital identity (s) relative to a given country, to a website, a service, an application, an identifier of reachability (telephone number, email, etc.), a group or a company materialized by one or a series of cryptographic private keys and associated with a public key. This recording of the public key of the digital identity to which a key is associated enables mutual authentication between the individual and the latter, which also makes it possible to secure communications and to authenticate irrevocably and mutually;
- This section also includes additional information such as the criticality, the pseudonym or the associated typing of each of the previously listed digital identities.

Data relating to the active smart contracts of the individual:
- insurance contract (s), purchase vouchers contracts, loan contracts or delivery contracts embodied by one or a series of cryptographic private keys;
- This section also includes additional information such as the criticality, the pseudonym or the associated typing of each of the accounts or contracts listed above.

Active Health Data
- Cryptographic private keys related to Personal Health Records, criticality, associated pseudonym;
- Data related to the active connected objects
- Cryptographic private keys related to connected objects associated with the individual, the criticality, the associated pseudonym (Car, House Lock . . . ));

The cell (69*b*) contains the encryption key (AES) used to encrypt the data (69*a*), this key (AES) is associated with a random number and is encrypted with each of the public keys (PUB) corresponding to the fingers of the individual, for example this key (AES) will be encrypted at least thirty times if the individual has previously recorded all of his ten fingers;

As is the case with all the transactions of the device (5), the cell (58) integrates the signature of the device (5) in order to make this transaction irrevocable and inalienable. This cell optionally integrates the signature (66) of the removable cryptoprocessor (28).

FIGS. 21*a* and 22 show the different types of data that will be integrated into the database. These include the personal and key data of a given individual, the list of his various fingerprints to allow access to the device even after damage of any one finger, address book data, groups, companies or institutions. As well as the certification and reputation devices that certify and inform users about the reputation of a given identity.

The signature illustrated in the transaction lines (52) and (67) is based on a method making it possible at the same time to ensure that the device is a recognized and authorized device, and also that it is not possible from this signature to correlate with a particular device and therefore a user. To do so, from the assembly, the device is initialized with a hundred private keys common to all devices and unknown receivers that will have only the list of public keys. A key update proposal is routinely sent by the devices (5) themselves. Each key will have a validity period of one month—the maximum period of use of the device without connection to the network. The search for the public key associated with a signature of the device (5) is one of the proofs of work of the receiving devices (70) which thus prove that it is valid. The private keys of the devices are deposited in the technical data database—FIG. 24—(TECH) and encrypted with one of the old public keys of the devices (5), which only allows the devices (5) to decrypt and to go up the key chain to access the last valid keys.

Figure 13A:
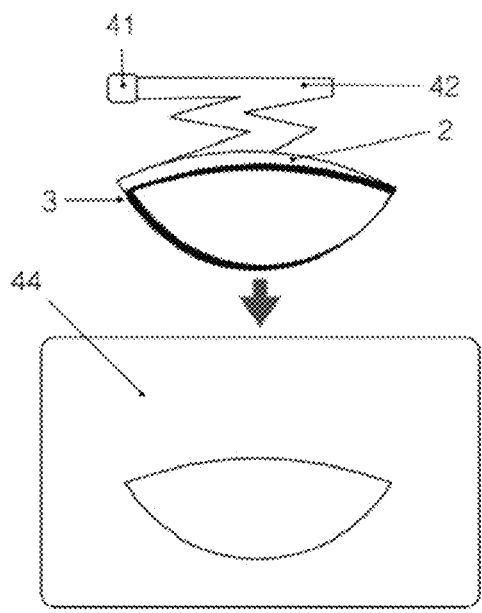
FIG. 13a schematic view of the assembly of the light strip (2) on the outer casing (44) according to one embodiment of the invention.
Figure 13B:
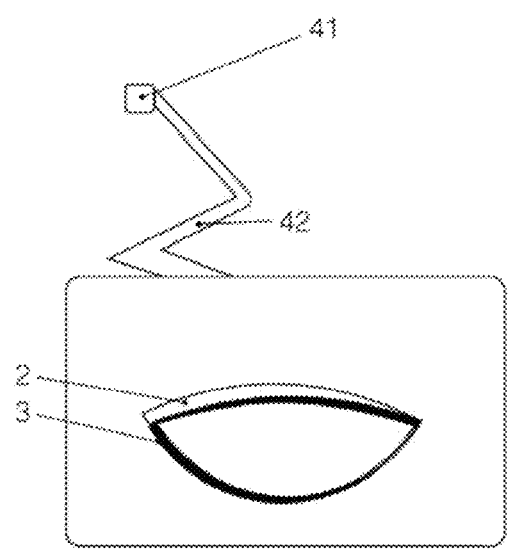
FIG. 13b schematic view of the light strip (2) assembled to the outer housing (44) according to one embodiment of the invention.

To allow the device (5) to directly communicate the information to the user, the device uses a light strip (2) located on the front face as shown in FIG. 1*b*. To propagate the light of the RGB LED (43) to the light strip (2), the device uses a glass fiber network (42) as shown in FIGS. 13*a* and 13*b*.

Referring to FIG. 7 Each sensor is attached to a cryptoprocessor of the same type as the central cryptoprocessor (25). Each sensor is thus definitely authenticated by the central cryptoprocessor (25) by a "hash-based challenge-resPonse" mechanism from a secret key initialized at the time of assembly of the components. The protocol mainly used is the I²C (Inter-Integrated Circuit) which is a data bus which makes it possible to connect a microprocessor and various circuits. The central cryptoprocessor, will send and receive orders and information through the I²C bus of:
- (25*a*): Ultrasonic sensor controller;
- (25*b*): Controller of the photographic sensor;
- (30): cache memory;
- (28): removable cryptoprocessor;
- (29): 433 Mhz network controller.

The lighting of the LEDs associated with the sensors is controlled by the GPIO ports of the controller (25), thus allowing the host system to be able to customize the light signals.

In order to carry out contactless transactions and to distribute the transactions to the surrounding devices, the device integrates a communication module (29) operating in the 433 Mhz band. This band being largely free on the entire planet. The device integrates a transmitter and a receiver as well as two active antennas. The first antenna, limited in terms of transmission/reception only works a few tens of centimeters (also known under the name NFC: near-field communication) and is used to detect and initialize the transactions without contacts in the vicinity, this antenna is also directional. The second antenna, not flanged, will issue transactions at a hundred meters on clear ground around. This radio transmission/reception is deactivated during biometric measurements as well as when the device is disconnected from the phone. The innovation in this device is to allow a set of devices to be able to operate almost autonomously through a mesh network—for example in a remote village of the world—by allowing the devices in the vicinity to know the transaction status without compromising confidentiality. Each device (5) is limited to one month of transaction without being connected to the network. The device (5) via the additional USB connection (31) further enables the host system to be connected to a satellite transceiver enabling it to receive and transmit messages via a satellite connection.

Figure 9:
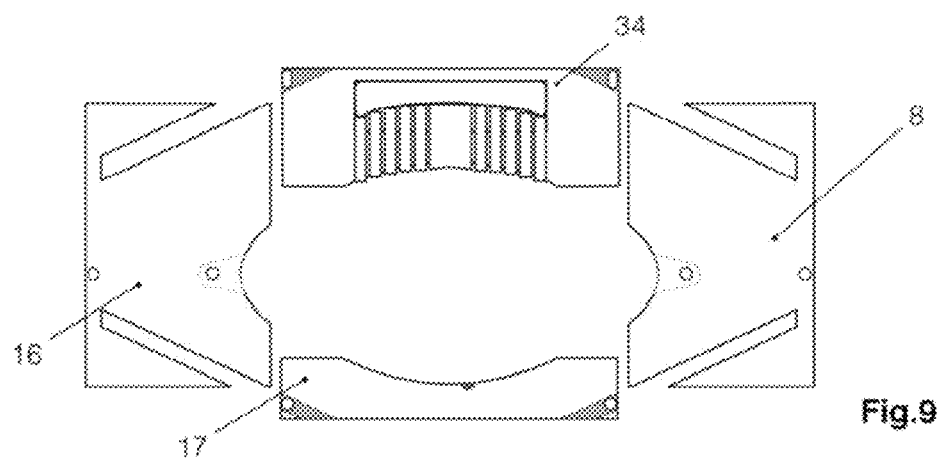
FIG. 9 is a schematic view of the first step of assembly of the device (5), in which the supports (17) and (34) in vertical translation slide in the supports (8) and (16) of horizontal translation according to one embodiment of the invention.
Figure 10:
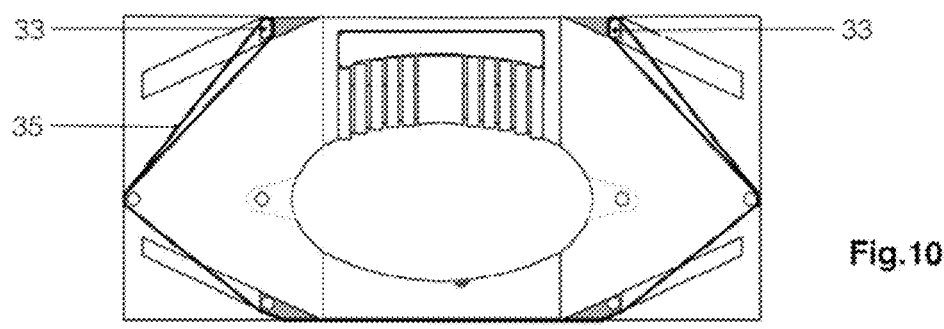
FIG. 10 schematic view of the second assembly step of the device (5), in which the pressure-holding elastic (10) is added on six of the eight lugs provided for fixing the diaphragms (46) in an embodiment of the invention.
Figure 11:
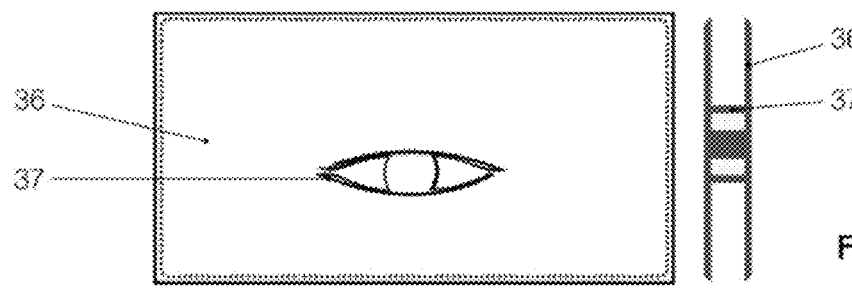
FIG. 11 schematic of front view and profile view of the silicone bag provided to be added to the device (5) in order to make it perfectly tight and elastic according to one embodiment of the invention.
Figure 14:
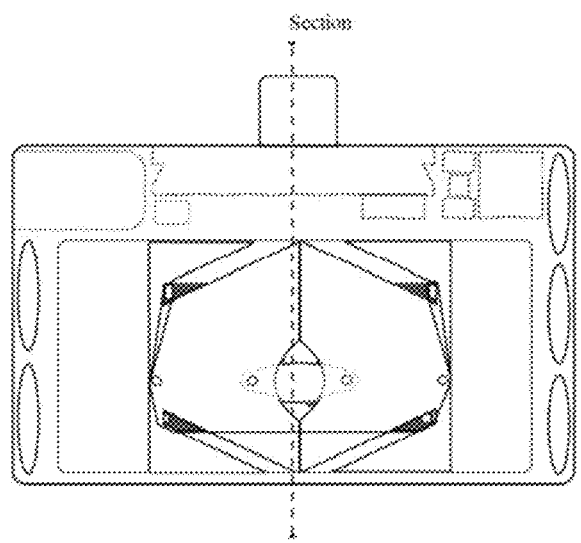
FIG. 14 Schematic view of the internal device mounted with the different components of FIGS. 10, 11 and 12 according to one embodiment of the invention.

FIG. 9 shows the unassembled device. FIG. 10 shows the four parts of the device to which was added an elastic (35) fixed on both sides of the device by two pins (33). FIG. 11 is a front and side view of the silicone membrane (36) which will cover the entire device, this figure also shows the mobile part (37), dotted the dots of glue and solid lines the portion 15 "clipped" on the silicone housing (38) of the device (5). FIG. 14 shows the device mounted in front view (excluding case and glass fibers).

Figure 15:
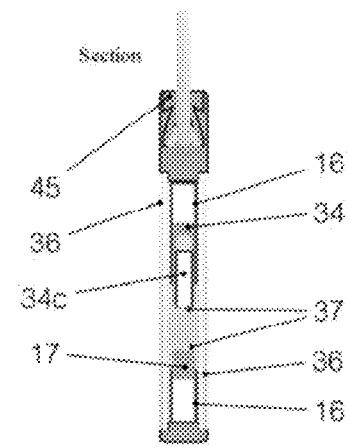
FIG. 15 schematic of the cross-sectional view of the device (5) mounted according to the sectional plane described in FIG. 14.

FIG. 15 represents the sectional view mentioned in FIG. 14, making it possible to identify the positioning of the flexible silicone membrane (36), the finger positioning pistons (35), the pressure pocket (35a) or again a different form of the membrane (36) on its movable portion (37).

Figure 16:
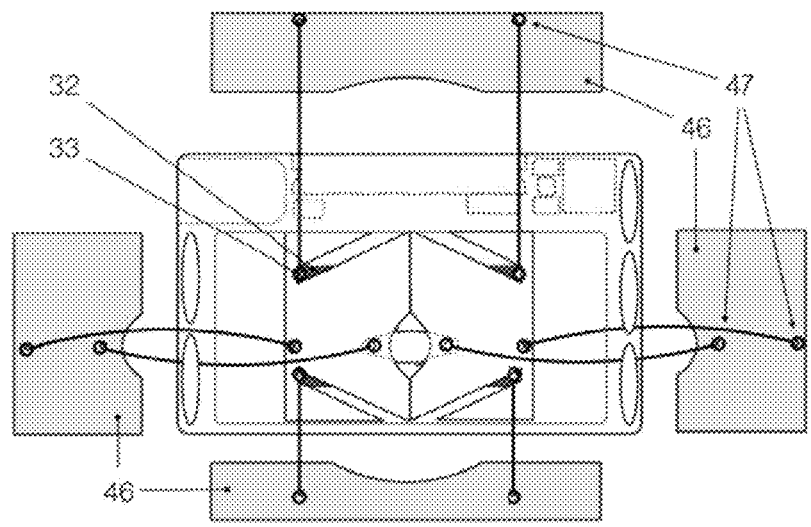
FIG. 16 schematic view of the method of assembling the diaphragms (46) on the various locations (32) provided on the flexible membrane (36) according to one embodiment of the invention.
Figure 17:
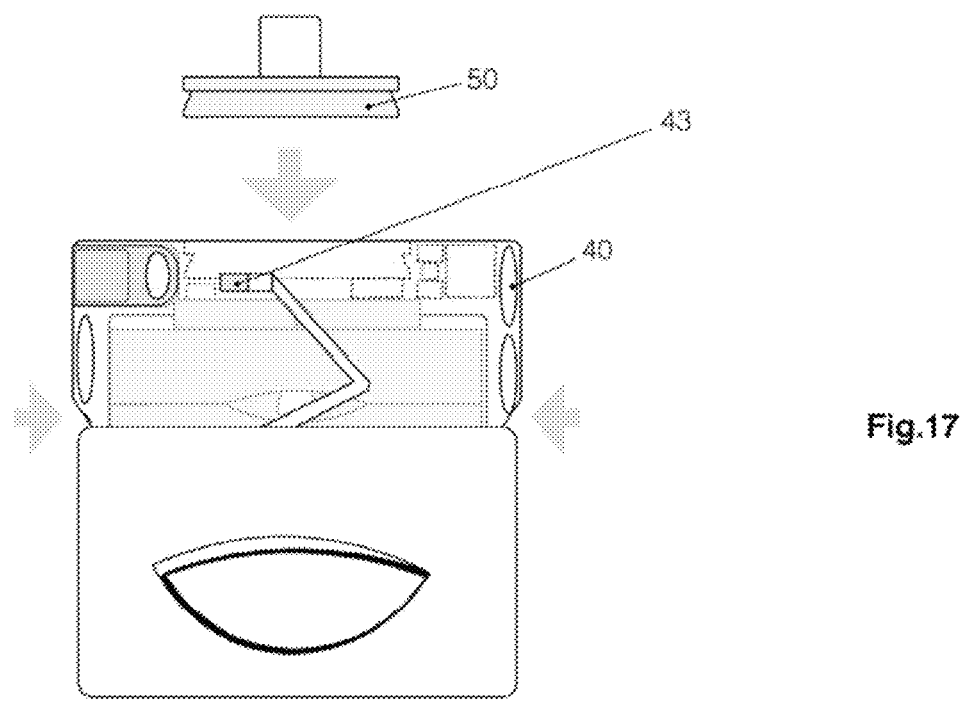
FIG. 17 schematic view of the positioning of the inner housing (38) in the outer housing (44) on which the light strip (2) is already positioned, the air pockets (40) being provided to retract at the time of mounting according to one embodiment of the invention.
Figure 18A:
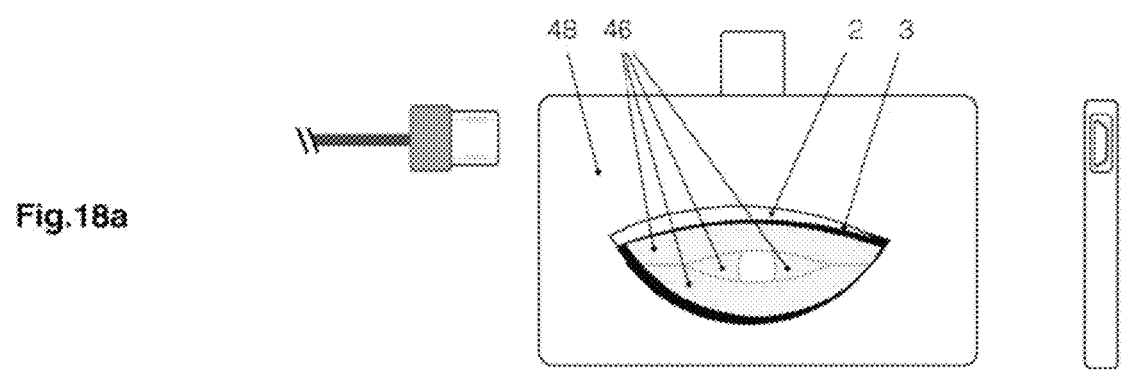
FIG. 18a schematic view of the final case as mounted in front view and left according to one embodiment of the invention.
Figure 18B:
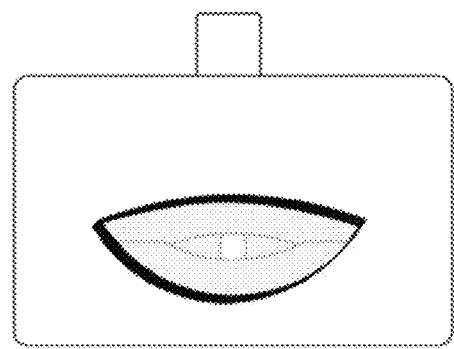
FIG. 18b schematic view of the final box as mounted in rear and right view according to one embodiment of the invention.
Figure 19A:
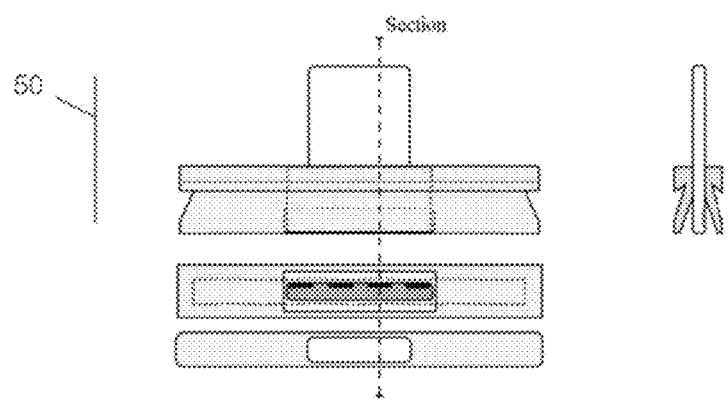
FIG. 19a schematic view of the device for connecting to telephones or tablets using the "USB-C" connector in front, bottom, top and profile views, respectively, according to one embodiment of the invention.
Figure 19B:
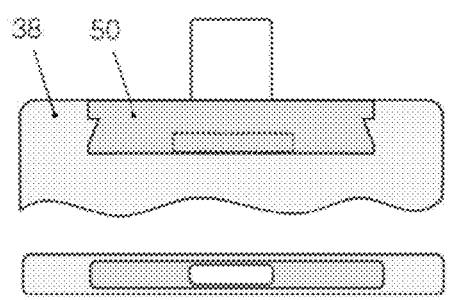
FIG. 19b schematic view of the integration of the connector (50) on the support (38) respectively in front, top and section views of the biometric device (5) according to one embodiment of the invention.
Figure 19C:
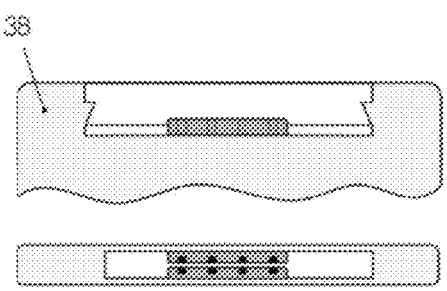
FIG. 19c schematic view of the housing (38) empty, without the connector (50) and the wire connector (51)—
Figure 19D:
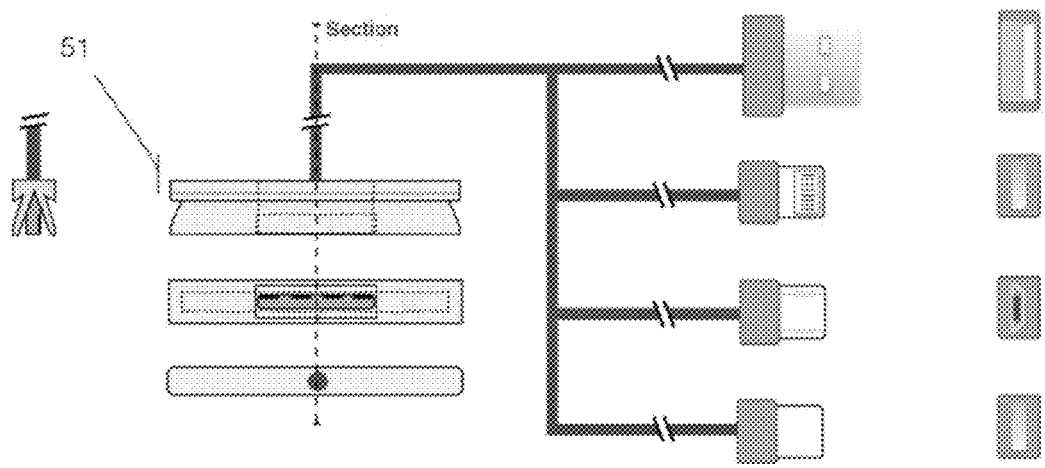
FIG. 19d—respectively in front and top views of the biometric device (5) in a manner of embodiment of the invention.

FIG. 16 shows the positioning of the diaphragms on the front face of the device—the process is the same on the rear face with the difference that they cover more surface to prevent the user from using the device in the opposite direction. The upper diaphragms are clipped onto the pins of the elastic (33), themselves clipped on the positioning pins (32). The pins (33) also incorporate a slight transverse clearance to go up or down depending on the size of the nail. The bottom diaphragms are clipped on the positioning pins (32) of the lower mobile part of the device. The left and right diaphragms are clipped onto the panels next to the sensors (ultrasonic and photographic sensor). The light strip (2) described in FIG. 13a is used to inform the user of the state of the device by a set of colors that will appear on the eyelash. The headband is composed of four parts:

The tip of the fiberglass (41) which captures the light emitted by the LED RGB (43) and fits into a zone contiguous to the LED (43) provided for this effect;

Fiberglass (42), which diffuses the emitted light to the "eyelash" or light strip (2). The fiberglass (42) is assembled in accordion so as to allow separate mounting of the silicone housing (38) and the light strip (2);

The eyelash or light strip (2) itself composed of transparent silicone in which are fixed the endings of fiberglass (42);

The round of the eye in black silicone (3) allows the parts to be mounted in the case.

The device (5) according to the invention is devoid of additional sensors for positioning the finger, the positioning is based only on three elements already described. The first being the mechanical device capable of imposing on the finger a perfect and reproducible positioning described in FIG. 8a. The second uses the Doppler effect—FIG. 3a (11) to wait for the immobility of the finger to start the process of biometric measurement, it also serves to check the good health of the individual and finally to stop the measurement following the second heartbeat. The latter uses the results generated by the measurements of the devices to check for any abnormal results, such as distal phalanx sense or results that are too unreadable to be exploited, for example if the device is too dirty or damaged.

The invention claimed is:

1. Biometric measurement device, characterized in that said device comprises:
   a positioning module comprising a measurement zone, said positioning module being configured to allow a user to have at least one finger in the measurement zone;
   a calculation module;
   an ultrasound module, coupled to the calculation module, and configured to perform an ultrasound of venous and nervous networks of a finger after the insertion of said finger into the measurement zone; and transmit, to the calculation module, the biometric data relating to said ultrasound of the venous and nervous networks of said finger;
   a photographic module, comprising several light sources, coupled with the calculation module, and configured to produce, after the insertion of a finger into the measurement zone:
      a first photograph of a venous network of said finger and by means of at least one infrared light source arranged so as to allow, once illuminated, the photographic module to take a photograph of the venous network of said finger, the infrared light source is arranged in a particular way to avoid the bone of the phalanx and transmit said photograph of the venous network to the calculation module;
      a second photograph of a fingerprint of said finger and by adding contrast light provided through coherent light sources having at least one wavelength between 400 nm and 800 nm; and transmitting said photograph of the fingerprint to the calculation module,
   wherein said calculation module being configured to generate biometric measurements specific to a user, following the introduction of one of said user's fingers into the measurement zone, according to said ultrasound of the venous and nervous networks of said finger, of the photograph of the venous network of said finger, of the photograph of the fingerprint of said finger; and
   the calculation module is configured to allow to define in the form of at least three previously registered finger identification control keys of a given individual:
      a finger enabled to activate an alert;
      a finger enabled to disable an alert;
      a finger entitled to a common use; and
      at least one additional finger previously recorded makes it possible to recover the data of said individual according to predefined conditions.

2. Device according to claim 1, wherein the ultrasound module further comprises a measurement module coupled with the calculation module, and configured to measure and transmit to the calculation module, a measurement of a heart rate and measuring blood pressure, performed on a finger after introduction of said finger into the measurement zone.

3. Device according to claim 1, in which the photographic module, coupled with the calculation module, is configured to produce a photograph in infrared light of a venous network of a finger, without adding external light after introduction of said finger, in the measurement zone; and transmitting said photograph of the venous network to the computation module.

4. Device according to claim 1, wherein the calculation module is configured to perform spectrometric analysis of the second photograph of a fingerprint by adding contrast light and transmitting said spectrometric analysis to the calculation module.

5. Device according to claim 1, wherein the positioning module comprises a stop and a blocking module configured to apply, after the introduction of a finger in the measurement zone, a pressure on said finger so as to block the fingernail of said finger against the abutment, and temporarily forcing said finger to remain in a substantially fixed position in the measurement zone.

6. Device according to claim 1, wherein the calculation module is further configured to authenticate a user following the introduction of one of said user's fingers into the measurement zone, only if vector image relating to said ultrasound of the venous and nervous networks of said finger, the measurement of a heart rate and the measurement of an arterial pressure, the photographs of the venous network of said finger, the photograph of the fingerprint of said finger, and the spectrometry of said finger are considered to meet a set of predefined compliance criteria.

7. Device according to claim 1, wherein the calculation module is configured to generate at least one clipped endpoint vector image of the ultrasound-related biometric measurement (ECR1), biometric measurements of infrared light photographs (ECR2), addition of infrared light and the biometric measurement relating to the photograph of fingerprints by addition of contrast light (ECR3).

8. Device according to claim 1, wherein the calculation module is adapted to implement a cryptographic method of digital signatures, encryption and decryption, the calculation module being configured for:

after introduction of a finger in the measurement zone, determine at least one biometric control key from each clipped vector measurement resulting respectively from the ultrasound biometric measurement (ECR1), the first (ECR2) and the second (ECR3) photography;

determine three private identification keys (PRIVa) (PRIVb) (PRIVc) by calculating three two-by-two combinations of said biometric control keys (CCMESa) (CCMESb) (CCMESc);

calculating three public identification keys (PUBa) (PUBb) (PUBc) relating to said three private identification keys;

calculating said three identification control keys (CCa) (CCb) (CCc) relating to said three public identification keys;

transmitting, to the external device, said three public identification keys and said three identification control keys; or, sign and/or decrypt and/or encrypt information transmitted by the external device.

9. Device according to claim 1, wherein the calculation module is configured to identify a user, following the introduction of one of said user's fingers into the measurement zone and to transmit said control keys of the user identifications of said finger to an external device, only if:

the measurement of the arterial pressure is below a predetermined threshold; and/or the measurement of the heart rate is below a predetermined threshold.

10. Device according to claim 1, wherein the calculation module is configured to record at least one second finger of the same individual from the collected biometric data only if it is considered to be responsive to a set of predefined compliance criteria.

11. Device according to claim 1 in which the calculation module is configured to certify an individual as unique if said individual has registered at least six fingers through at least one device.

12. Device according to claim 1, characterized by the integration of the biometric device inside a telephone, in a format for performing biometric measurements for fingers of different sizes integrated or not in the phone screen.

* * * * *